April 23, 1929.  H. P. MacGREGOR  1,710,176
LUBRICATED PLUG VALVE
Filed May 13, 1927

INVENTOR
H. P. MacGregor
by
James C. Bradley
Atty

Patented Apr. 23, 1929.

1,710,176

UNITED STATES PATENT OFFICE.

HALBERT P. MacGREGOR, OF CLAYTON, MISSOURI, ASSIGNOR TO MacGREGOR VALVE COMPANY, OF ST. LOUIS, MISSOURI, A CORPORATION OF MISSOURI.

LUBRICATED PLUG VALVE.

Application filed May 13, 1927. Serial No. 191,043.

Figure 1:
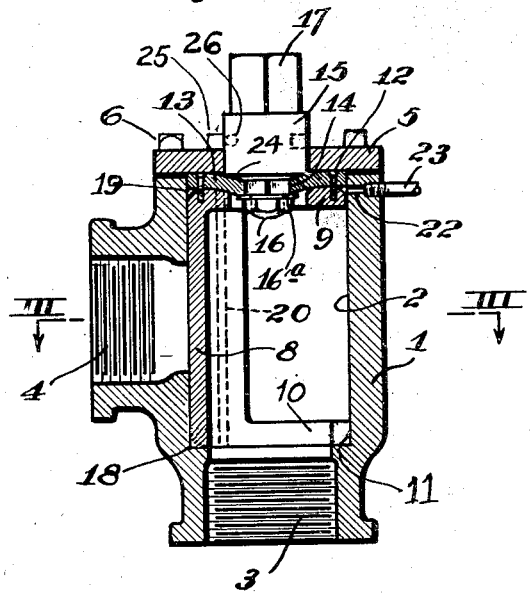
Figure 2:
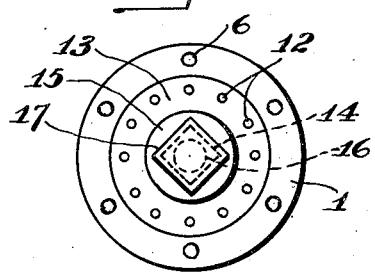
Figure 3:
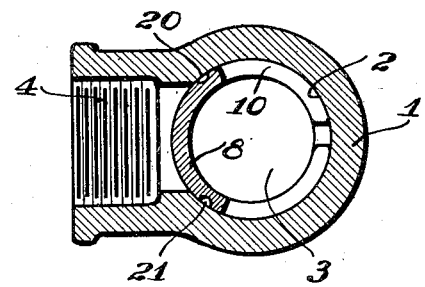
Figure 4:
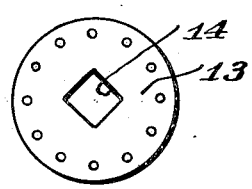
Figure 5:
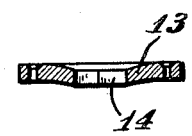

The invention relates to lubricated plug valves. It involves a modification of the construction shown in my application, Serial Number 181,114, filed April 5, 1927, in that the present valve is of the angle plug type, so that the valve may serve as an L, but it will be understood that certain features of construction are applicable to valves, which are not of the angle valve type. The invention has for its primary objects, the provision of an angle plug valve having the advantages and functions of the valve shown and described in said application; the provision of a valve constructed so that the turning force as applied to the plug tends to cause a contraction thereof so as to loosen it, in case of sticking; the provision of a valve in which the line pressure tends to tighten the plug or shell against leakage; and the provision of a valve having improved lubricating means, so arranged that the application of lubricant under sufficient pressure will loosen the plug in its seat, in case it has become stuck. The valve plug is shown as straight, but is obviously capable of modification in this and other particulars the same as set forth in said application. One embodiment of the invention is illustrated in the accompanying drawings, wherein:

Figure 1 is a vertical section through the valve. Fig. 2 is a plan view of the valve with the cover plate removed. Fig. 3 is a section on the line III—III of Fig. 1. And Figs. 4 and 5 are detail views of the diaphragm employed, Fig. 4 being a plan view and Fig. 5 a transverse section.

Referring to the drawings, 1 is the valve body or casing, provided with a bore 2 and a passage transverse thereto, comprising the inlet 3 and the outlet 4. The upper side of the casing is open to permit of the insertion of the plug, with a cap or closure 5 over such side held by the bolts 6.

The valve plug comprises a particular shell 8, having at its ends the rings 9 and 10, the latter of which seats against the annular shoulder 11 and is split, as indicated in Fig. 3. Secured to the upper end of the plug and the ring 9 by the screws 12 or rivets or by welding, is the diaphragm 13, preferably coned downwardly and provided with the square opening 14, which fits the lower end of the stem 15. The stem has a threaded lower end 16, carrying a washer and a nut 16ª, and the square upper end 17 for engagement by a handle or tool.

The corners of the valve plug and rings 9 and 10 are rounded so as to provide the grease passages or grooves 18 and 19, and these grooves are connected by the vertical grooves 20 and 21. Connected to the groove 19, by means of the passage 22 is the grease or lubricant supply pipe 23. Any suitable pressure device, such as a grease gun, may be employed for securing the necessary supply of lubricant under pressure. The shell 8 is of relatively light, springy metal, so that when a heavy pressure is applied to the vertical grooves 20 and 21, the shell is sprung slightly away from the surface of the bore. This springy action is facilitated, due to the making of the lower ring 10 in two parts. This slight separation of the surfaces of the shell and bore, is sufficient to admit a film of lubricant, which is carried by capillary attraction and by the turning of the shell, throughout the contacting areas of the shell and bore. The yielding of the shell under pressure not only provides for a thorough lubrication of the rubbing surfaces, but serves to free the plug in case it should have become stuck in open position. The shape of the diaphragm also assists in freeing the shell, when it becomes stuck, as a powerful turning force applied to the stem 15 tends to cone the diaphragm to an increased degree, thus reducing its circumference and pulling the upper portion of the shell away from the bore.

Pressure applied to the inside of the shell tends to make it seal still more tightly and also tends to flatten the diaphragm 13, thus increasing the diameter and making the upper end of the shell and the ring 9 fit still more tightly in the bore. The lubricant used, when of the proper consistency, acts as a seal for the valve, as it fills the grooves 18 and 19 and prevents the passage of liquid. The upper surface of the diaphragm surrounding the opening 14 has a ground fit with the shoulder 24 on the stem, and as this engagement is maintained under pressure by the nut 16ª, a tight joint is secured at this point. If desired, the diaphragm may be brazed to the lower end of the stem or made integral therewith.

As above indicated, the right hand side of the shell 8 is the inlet side, as the pressure of the liquid in the valve, as thus applied, tends to still more firmly seat the shell 8 against the bore of the casing, while a reversal of this arrangement with the left hand side of the valve as the inlet or pressure side, would give a reverse effect, as the pressure would tend to spring the shell away from its seat, and thus cause leakage. In order to insure that the valve will always occupy the proper position with its concave side facing the pressure, suitable engaging stops 25 and 26 are employed on the stem 15 and cover 5, such stops coming into engagement when the valve reaches full closed or full open position.

As in the construction of said pending application, it will be understood that the invention applies equally well to any other form of valve in which the shell extends around any desired portion of the bore, the only requirement being that it shall be free to yield under pressure and so free itself.

What I claim is:

1. In combination, an angle valve body having a bore entirely therethrough and a passage for liquid leading from the bore transversely thereof through the side of the body, and a shell plug of tubular shape, but cut away longitudinally so that its side edges are free to move relatively, mounted for rotation in the bore with its outer surface fitting against the inner surface of the bore, annular reinforcing rings at each end of the shell integral therewith, and having their corners rounded away to provide circumferential passages between such rings and the body, a longitudinal groove connecting said passages and means for supplying lubricant under pressure to one of said circumferential passages.

2. In combination, an angle valve body having a bore entirely therethrough and a passage for liquid leading from the bore transversely thereof through the side of the body, and a shell plug of tubular shape, but cut away longitudinally so that its side edges are free to move relatively, mounted for rotation in the bore with its outer surface fitting against the inner surface of the bore, a diaphragm of relatively thin sheet metal secured to the upper end of the shell, a stem secured to the diaphragm, a cap secured to the body above the diaphragm, a lubricant passage extending between the opposing surfaces of the shell and body, and means for supplying lubricant under pressure to said lubricant passage.

3. In combination, an angle valve body having a bore entirely therethrough and a passage for liquid leading from the bore transversely thereof through the side of the body, and a shell plug of tubular shape, but cut away longitudinally so that its side edges are free to move relatively, mounted for rotation in the bore with its outer surface fitting against the inner surface of the bore, a diaphragm of relatively thin, resilient sheet material secured to the upper end of the shell, a stem secured to the diaphragm, a cap secured to the body above the diaphragm, a lubricant passage extending between the opposing surfaces of the shell and body, and means for supplying lubricant under pressure to said lubricant passage.

4. In combination, an angle valve body having a bore entirely therethrough and a passage for liquid leading from the bore transversely thereof through the side of the body, and a shell plug of tubular shape, but cut away longitudinally so that its side edges are free to move relatively, mounted for rotation in the bore with its outer surface fitting against the inner surface of the bore, a dished or concaved diaphragm of relatively thin, resilient material secured to the upper end of the shell, a stem secured to the diaphragm, a cap secured to the body above the diaphragm, a lubricant passage extending between the opposing surfaces of the shell and body, and means for supplying lubricant under pressure to said lubricant passage.

In testimony whereof, I have hereunto subscribed my name this 10th day of May, 1927.

HALBERT P. MacGREGOR.